United States Patent [19]
Chung et al.

[11] Patent Number: 5,509,012
[45] Date of Patent: Apr. 16, 1996

[54] MULTI-BUS REAL-TIME MESSAGE TRANSMITTER

[75] Inventors: Man S. Chung; Heon S. Shin, both of Seoul, Rep. of Korea

[73] Assignee: Korea Telecommunication Authority, Jongro, Rep. of Korea

[21] Appl. No.: 293,395

[22] Filed: Aug. 19, 1994

[30] Foreign Application Priority Data

Feb. 25, 1994 [KR] Rep. of Korea .................. 94-3633

[51] Int. Cl.[6] ...................... H04J 3/16; H04J 3/02
[52] U.S. Cl. .............. 370/79; 370/85.3; 370/85.9; 370/100.1; 340/825.12
[58] Field of Search ............. 370/85.4, 17, 85.1, 370/85.2, 85.6, 61, 77, 79, 85.3, 85.9, 85.11, 100.1; 340/825.06, 825.1, 825.12, 825.14, 825.2; 375/219, 220, 354, 356

[56] References Cited

U.S. PATENT DOCUMENTS

| | | | |
|---|---|---|---|
| 4,654,889 | 3/1987 | Shutterly | 455/601 |
| 4,805,169 | 2/1989 | Van Asselt | 370/85.4 |
| 4,825,204 | 4/1989 | Nakamura | 370/85.4 |
| 4,918,690 | 4/1990 | Markkula | 370/85.3 |
| 5,329,528 | 7/1994 | Akai et al. | 370/85.4 |
| 5,335,226 | 8/1994 | Williams | 370/85.2 |

Primary Examiner—Alpus H. Hsu
Assistant Examiner—Ricky Ngo
Attorney, Agent, or Firm—Morgan & Finnegan

[57] ABSTRACT

A multi-bus real-time message transmitter including a buffer memory for temporarily storing transmission messages, each of the transmission messages containing transmission time data designating time that the transmission message is to be sent, a plurality of transceivers connected to a plurality of bus lines, respectively, the plurality of transceivers sensing statuses of the corresponding bus lines, outputting the resultant bus line status data, sending the transmission messages stored in the buffer memory to the corresponding bus lines and sending messages received from the corresponding bus lines to the buffer memory, a timer for generating an interrupt signal at a fixed period and counting real-time, and a protocol processor for determining a network status in response to the bus line status data from the plurality of transceivers, setting a time window whenever the interrupt signal is generated by the timer, the time window having a time width different according to the determined network status, and controlling the plurality of transceivers and the buffer memory so that one of the transmission messages containing one of the transmission time data corresponding to the set time window can be sent from the buffer memory to an idle one of the plurality of bus lines through any one of the plurality of transceivers.

4 Claims, 4 Drawing Sheets

MULTI-BUS REAL-TIME MESSAGE TRANSMITTER

BACKGROUND OF THE INVENTION

1. Field of the Invention

The present invention relates to a transmitter for sending a message from a data processing unit such as a host computer in real-time over a plurality of bus lines on the basis of a window protocol.

2. Description of the Prior Art

A conventional zeal-time message transmitter using a window protocol is adapted to send a message from a data processing unit such as a host computer to a designated different message transmitter over a single bus line. To this end, the conventional message transmitter monitors whether the bus line is occupied by the different message transmitter and sends the message to the different message transmitter for a time period that the bus line is not occupied by the different message transmitter in accordance with the monitored result. For this reason, the conventional real-time message transmitter has a disadvantage in that it cannot send the message in a proper time because the bus line may be occupied for a long time by the different message transmitter. This disadvantage of the conventional real-time message transmitter becomes more prominent as the message to be sent is increased in amount.

To solve the above problem, there has recently been proposed a message transmission network having a plurality of bus lines. However, a conventional message transmitter employed in the multi-bus message transmission network cannot send the message in the proper time as before because it controls the bus lines individually.

SUMMARY OF THE INVENTION

Therefore, the present invention has been made in view of the above problem, and it is an object of the present invention to provide a multi-bus real-time message transmitter which is capable of sending a message in a proper time on the basis of a window protocol and enhancing a message transmission efficiency with an increase in the number of bus lines.

In accordance with one aspect of the present invention, there is provided a multi-bus real-time message transmitter comprising memory means for temporarily storing transmission messages, each of said transmission messages containing transmission time data designating the time that said transmission message is to be sent; a plurality of transceivers connected to a plurality of bus lines, respectively, said plurality of transceivers sensing statuses of the corresponding bus lines, outputting the resultant bus line status data, sending the transmission messages stored in said memory means to the corresponding bus lines and sending messages received from the corresponding bus lines to said memory means; timer means for generating an interrupt signal at a fixed period and counting real-time; and protocol a controller for determining a network status in response to the bus line status data from said plurality of transceivers, setting a time window whenever the interrupt signal is generated by said timer means, said time window being adjusted in time width according to the determined network status, and controlling said plurality of transceivers and said memory means so that one of the transmission time data corresponding to the set time window can be sent from said memory means to an idle one of said plurality of bus lines through any one of said plurality of transceivers.

In accordance with another aspect of the present invention, there is provided a method of controlling a multi-bus real-time message transmission, comprising the steps of detecting busy and idle statuses and message collisions of a plurality of bus lines and determining the network status in accordance with the detected result; counting a real-time; inputting transmission messages containing transmission time data; setting a time window at the fixed period, said time window being adjusted in time width according to the determined network status; searching for one of the transmission messages containing one of the transmission time data corresponding to the set time window and sending the searched transmission message to the idle bus line.

BRIEF DESCRIPTION OF THE DRAWINGS

The above and other objects, features and advantages of the present invention will be more clearly understood from the following detailed description taken in conjunction with the accompanying drawings in which.

DETAILED DESCRIPTION OF THE PREFERRED EMBODIMENT

Figure 1:
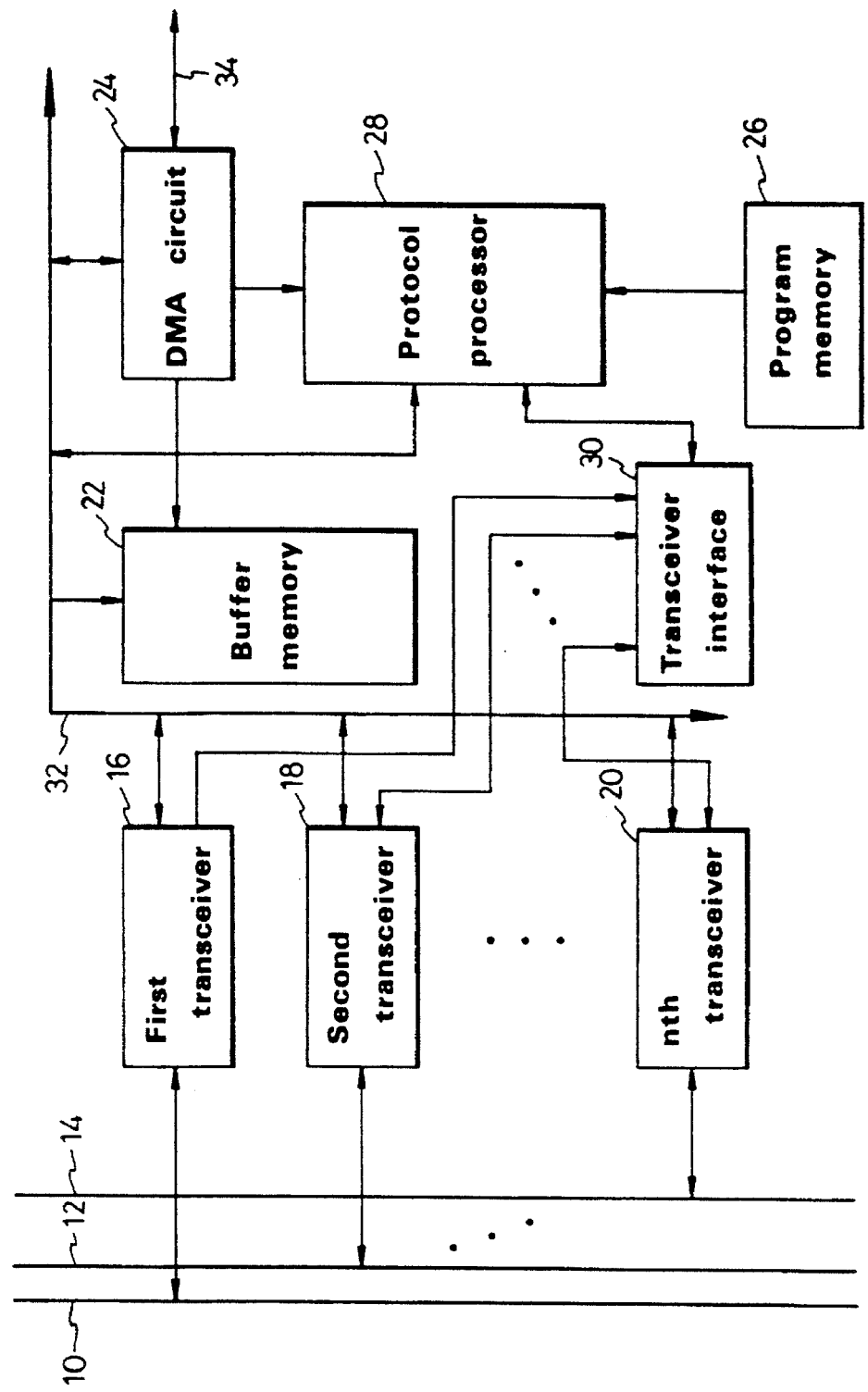
FIG. 1 is a block diagram of a multi-bus real-time message transmitter in accordance with an embodiment of the present invention.

Referring to FIG. 1, there is shown a block diagram of a multi-bus real-time message transmitter in accordance with an embodiment of the present invention. As shown in this drawing, the multi-bus real-time message transmitter comprises first to nth transceivers 16, 18 and 20 connected to first to nth bus lines 10, 12 and 14, respectively, and a buffer memory 22 for storing temporarily transmission and received messages through the first to nth transceivers 16, 18 and 20. The first transceiver 16 receives the message from the first bus line 10 and stores the received message into the buffer memory 22, or sends the transmission message stored in the buffer memory 22 to the first bus line 10. Also, the first transceiver 16 converts the transmission message from the buffer memory 22 into a signal format required by the first bus line 10, or the received message from the first bus line 10 into a data format required by a data processing unit (not shown). Upon receiving the message from the first bus line 10, the first transceiver 16 detects control signals including a synchronous signal from the received message and outputs the detected control signals to a transceiver interface 30. The first transceiver 16 also senses a status of the first bus line 10 and outputs resultant status data to the transceiver interface 30. The second to nth transceivers 18 and 20 perform the message transmission and reception operations in a similar manner to those of the first transceiver 16. Also, the second to nth transceivers 18 and 20 sense statuses of the second to nth bus lines 12 and 14 and output the resultant status data to the transceiver interface 30, respectively.

The multi-bus real-time message transmitted also comprises a direct memory access (DMA) circuit 24 for accessing the buffer memory 22, and a protocol processor 28 for controlling the message transmission and reception operations of the first to nth transceivers 16, 18 and 20 and the operation of the DMA circuit 24. The DMA circuit 24 is operated under the control of the protocol processor 28 to allow the buffer memory 22 to store the transmission messages from the data processing unit or the received messages from the first to nth transceivers 16, 18 and 20 transferred via an internal bus 32. The DMA circuit 24 is also operated under the control of the protocol processor 28 to read the messages stored in the buffer memory 22 and transfer the read messages to the first to nth transceivers 16, 18 and 20, the data processing unit and the protocol processor 28 via the internal bus 32. Also, the DMA circuit 24 receives a communication control signal from the protocol processor 28 and sends the received communication control signal to the data processing unit via an extended control line 34, or receives a communication control signal from the data processing unit via the extended control line 34 and sends the received communication control signal to the protocol processor 28, The protocol processor 28 controls the first to nth transceivers 16, 18 and 20 and the DMA circuit 24 on the basis of a control program stored in a program memory 26, so as to enable the message transmission and reception. To this end, the protocol processor 28 determines a current network status on the basis of the first to nth bus line status data from the first to nth transceivers 16, 18 and 20 and previously set network status information. The protocol processor 28 includes a timer for generating an interrupt signal at a fixed period and counting real-time. Whenever the interrupt signal is generated by the timer, the protocol processor 28 sets a time window to be compared with transmission time data LS contained in the transmission message. The protocol processor 28 searches for one of the transmission messages containing one of the transmission time data LS corresponding to the set time window. Then, the protocol processor 28 controls the first to nth transceivers 16, 18 and 20 and the DMA circuit 24 so that the searched transmission message can be sent from the buffer memory 22 to any one of the first to nth bus lines 10, 12 and 14. The set time window is re-adjusted according to the current network status. The timer in the protocol processor 28 is in synchronization with a timer included in a protocol processor of a different multi-bus real-time message transmitter (not shown) connected to the first to nth bus lines 10, 12 and 14.

The transceiver interface 30 is connected between the first to nth transceivers 16, 18 and 20 and the protocol processor 28 to transfer the first to nth bus line status data and the control signals from the first to nth transceivers 16, 18 and 20 to the protocol processor 28. The transceiver interface 30 is also adapted to transfer operation control signals from the protocol processor 28 for the control of the transmission and reception operations of the first to nth transceivers 16, 18 and 20 to the first to nth transceivers 16, 18 and 20.

The transmission time data LS contained in the transmission message can be calculated in the data processing unit on the basis of the following equation (1):

$$LS = D - TD \qquad (1)$$

where, D is an end time of the transmission message and TD is a propagation delay time of the transmission message.

The propagation delay time TD of the transmission message can be calculated on the basis of the following equation (2):

$$TD = (1/bps) \text{ message length} + \delta + \text{time required in the transmission} \qquad (2)$$

where, bps is a transmission speed of the bus, δ is the period of the interrupt signal generated by the timer included in the protocol processor 28 and a unit of the message length is a bit.

Figure 2:
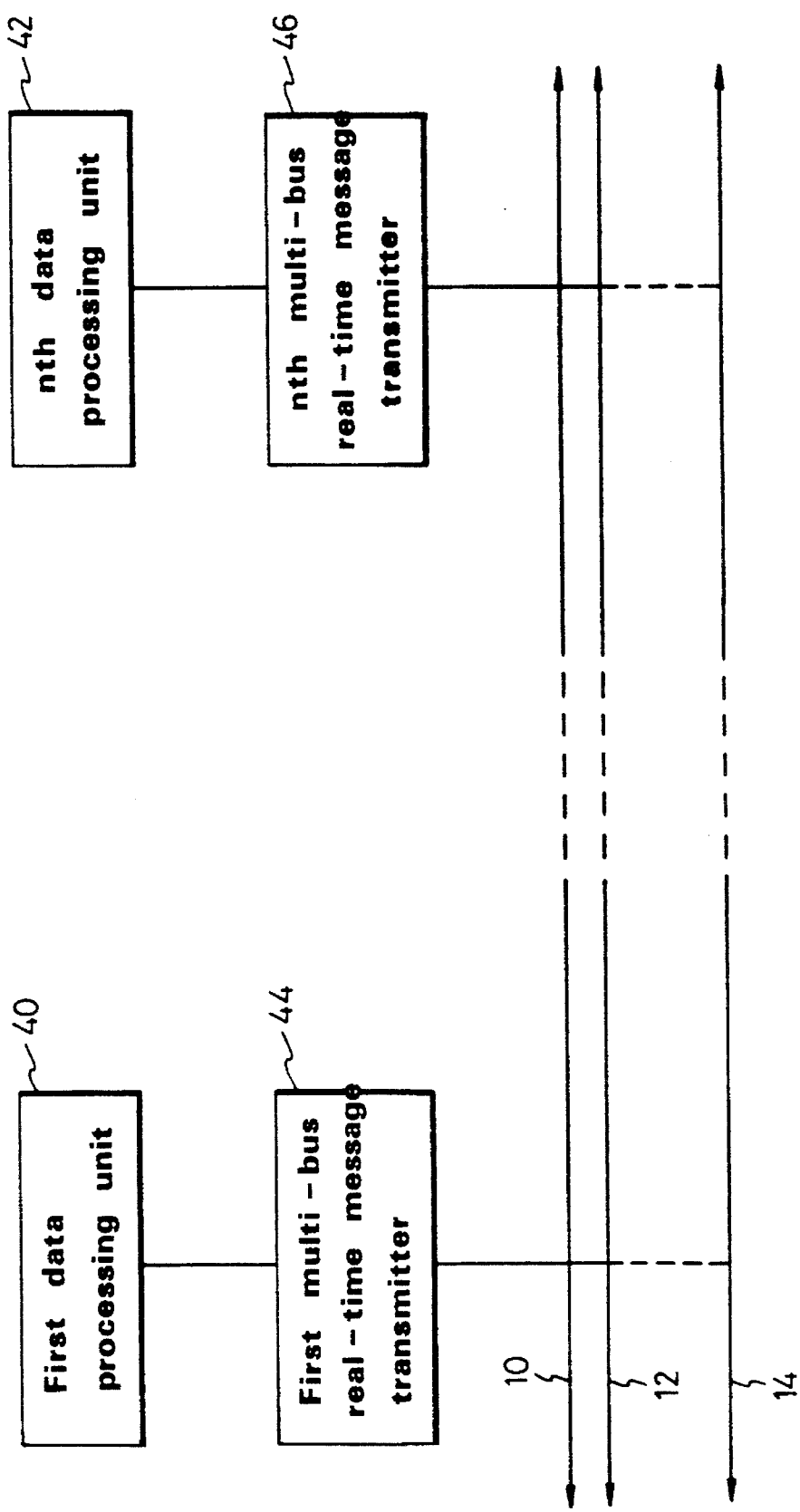
FIG. 2 is a schematic view of a multi-bus transmission system to which the multi-bus real-time message transmitter of FIG. 1 is applied.

Referring to FIG. 2, there is shown a schematic view of a multi-bus transmission system to which the multi-bus real-time message transmitter of FIG. 1 is applied. In the multi-bus transmission system of FIG. 2, first to nth multi-bus real-time message transmitters 44 and 46 are connected to first to nth data processing units 40 and 42, respectively, and to the first to nth bus lines 10, 12 and 14 in common. The first data processing unit 40 generates the transmission messages to be sent to different data processing units, the transmission messages containing transmission data and the transmission time data LS designating the time to be sent. The generated transmission messages from the first data processing unit are sent to the first multi-bus real-time message transmitter 44.

In the first multi-bus real-time message transmitter 44, the transmission messages from the first data processing unit are stored into the buffer memory in the order of the transmission time data LS. The transmission time data LS of the transmission messages are compared with the time window set at the fixed period. As a result of the comparison, one of the transmission messages containing one of the transmission time data LS corresponding to the time window is sent to any one of the first to nth bus lines 10, 12 and 14. Also, the first multi-bus real-time message transmitter 44 senses the statuses of the first to nth bus lines 10, 12 and 14 and changes the current network status CS on the basis of the sensed statuses of the first to nth bus lines 10, 12 and 14. The time window is contracted or expanded or has a normal width according to the current network status CS.

The operations of the nth data processing unit 42 and the nth multi-bus real-time message transmitter 46 are the same as those of the first data processing unit 40 and the first multi-bus real-time message transmitter 44, respectively, and a description thereof will thus be omitted.

Figure 3A:
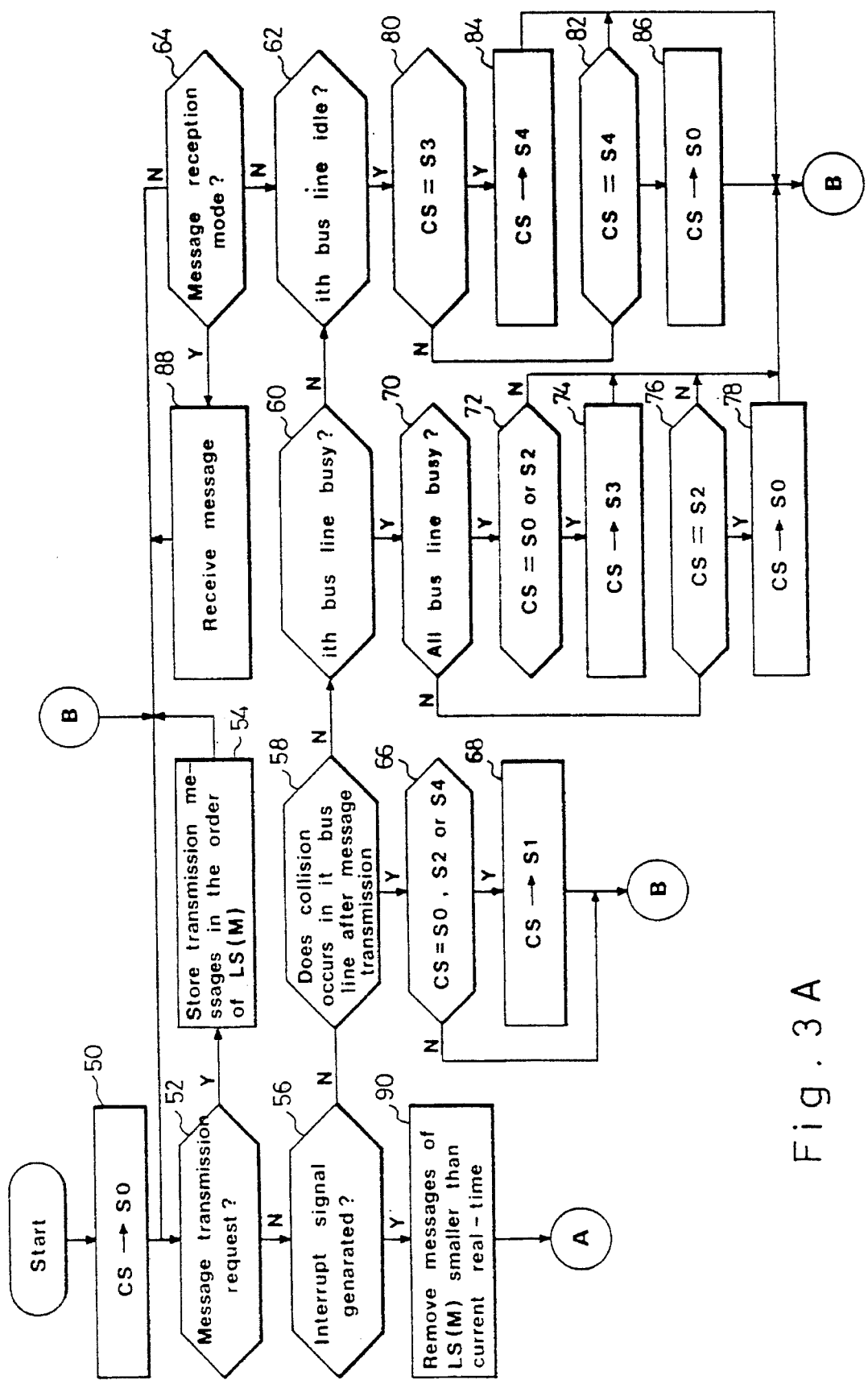
FIGS. 3A and 3B are flowcharts is a flowchart illustrating a method of controlling multi-bus real-time message transmission in accordance with the embodiment of the present invention.
Figure 3B:
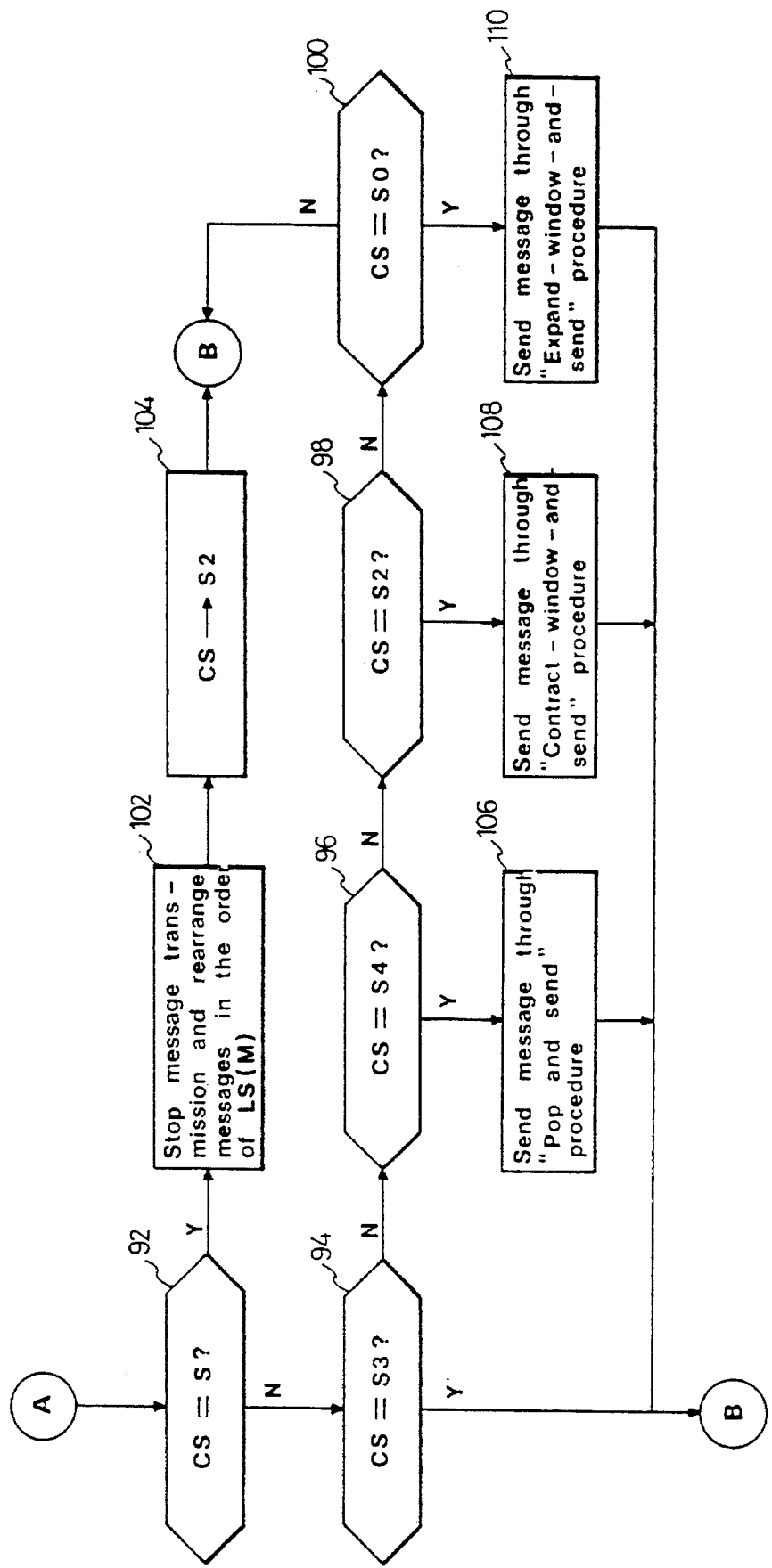

Referring to FIGS. 3A and 3B, are shown flowcharts there shown a flowchart illustrating a method of controlling multi-bus real-time message transmission in accordance with the embodiment of the present invention, which is performed by the protocol processor 28 shown in FIG. 1 to send the transmission messages over the multiple bus lines. This method of FIG. 3 will hereinafter be described in detail in connection with the multi-bus real-time message transmitter shown in FIG. 1.

Upon power-on, the protocol processor 28 initializes its scratchpad memory and the buffer memory 22 and sets the current network status CS in a first mode SO indicating that at least one bus line is idle, at the step 50. The protocol processor 28 then checks at the step 52 whether a message transmission request signal from the data processing unit is sent through the extended control line 34 and the DMA circuit 24. Here, the message transmission request signal from the data processing unit contains the transmission time data LS. If it is checked at the step 52 that the message transmission request signal from the data processing unit is present, the protocol processor 28 stores the transmission time data LS from the data processing unit into its scratchpad memory. Also at the step 54, the protocol processor 28 controls the DMA circuit 24 so that the transmission messages which are supplied from the data processing unit to the buffer memory 22 via the internal bus 32 can be stored into the buffer memory 22 in the order of the transmission time data LS contained therein. In this case, the DMA circuit 24 enables the buffer memory 22 to be operated in a write mode and applies addresses thereto so that the transmission messages from the data processing unit can be stored into the buffer memory 22 in the order of the transmission time data LS contained therein. The protocol processor 28 performs the step 52 again after controlling the DMA circuit 24.

On the other hand, if it is checked at the step 52 that the message transmission request signal from the data processing unit is not present, the protocol processor 28 checks at the step 56 whether the interrupt signal is generated by the timer therein. If it is checked at the step 56 that the interrupt signal is not generated by the timer, the protocol processor 28 checks at the step 58 whether a message collision occurs in a random ith bus line, on the basis of ith bus line status data which is sent from a random ith transceiver thereto through the transceiver interface 30. If it is checked at the step 58 that the message collision does not occur in the ith bus line, the protocol processor 28 checks at the step 60 whether the ith bus line is busy. If it is checked at the step 60 that the ith bus line is not busy, the protocol processor 28 checks at the step 62 whether the ith bus line is idle. If it is checked at the step 62 that the ith bus line is not idle, the protocol processor 28 checks at the step 64 whether the ith transceiver is receiving the message. On the contrary, if it is checked at the step 58 that the message collision occurs in the ith bus line, the protocol processor 28 discriminates at the step 66 on the basis of the current network status data CS stored in its register whether the current network status is in the first mode S0, a third mode S2 or a fifth mode S4. If it is discriminated at the step 66 that the current network status is in the first mode S0, the third mode S2 or the fifth mode S4, the protocol processor 28 changes the current network status data CS to "S1" to change the current network status to a second mode S1 at the step 68. If it is discriminated at the step 66 that the current network status is not in the first mode S0, the third mode S2 and the fifth mode S4, or after performing the step 68, the protocol processor 28 returns to the step 52. The second mode S1 indicates that the ith bus line is busy because of collision of the transmission message with a message from a different multi-bus real-time message transmitter. The third mode S2 indicates that the ith bus line is idle after the collision of the transmission message with the message from the different multi-bus real-time message transmitter. The fifth mode S4 indicates that the ith bus line is idle after sending the transmission message.

If it is checked at the step 60 that the ith bus line is busy, the protocol processor 28 checks at the step 70 whether the bus lines 10, 12 and 14 are all busy. The protocol processor 28 performs the step 70 by checking all the bus line status data which are sent from the transceivers 16, 18 and 20 thereto through the transceiver interface 30. If it is checked at the step 70 that the bus lines 10, 12 and 14 are all busy, the protocol processor 28 discriminates at the step 72 on the basis of the current network status data CS whether the current network status is in the first mode S0 or the third mode S2. If it is discriminated at the step 72 that the current network status is in the first mode S0 or the third mode S2, the protocol processor 28 changes the current network status data CS to "S3" to change the current network status to a fourth mode S3 at the step 74. On the contrary, if it is checked at the step 70 that all of the bus lines 10, 12 and 14 are not busy, the protocol processor 28 discriminates at the step 76 on the basis of the current network status data CS whether the current network status is in the third mode S2. If it is discriminated at the step 76 that the current network status is in the third mode S2, the protocol processor 28 changes the current network status data CS to "S0" to change the current network status to the first mode S0 at the step 78. On the other hand, if it is discriminated at the step 72 that the current network status is not in the first mode S0 and the third mode S2 or at the step 76 that the current network status is not in the third mode S2, or after performing the step 74 or the step 78, the protocol processor 28 returns to the step 52. The fourth mode S3 indicates that the bus lines 10, 12 and 14 are all busy because of the message transmission.

If it is checked at the step 62 that the ith bus line is idle, the protocol processor 28 discriminates at the steps 80 and 82 on the basis of the current network status data CS, respectively, whether the current network status is in the fourth mode S3 and the fifth mode S4. If it is discriminated at the step 80 that the current network status is in the fourth mode S3, the protocol processor 28 changes the current network status data CS to "S4" to change the current network status to the fifth mode S4 at the step 84. Also at the step 84, the protocol processor 28 initializes all time window upper limit values stored in its scratchpad memory. If it is discriminated at the step 82 that the current network status is in the fifth mode S4, the protocol processor 28 changes the current network status data CS to "S0" to change the current network status to the first mode S0 at the step 86. On the other hand, if it is discriminated at the steps 80 and 82 that the current network status is not in the fourth mode S3 and the fifth mode S4 or after performing the step 84 or the step 86, the protocol processor 28 returns to the step 52.

If it is checked at the step 64 that the ith transceiver is receiving the message, the protocol processor 28 controls the DMA circuit 24 so that the message received by the ith transceiver can be stored into the buffer memory 22, at the step 88. Also at the step 88, the protocol processor 28 controls the ith transceiver through the transceiver interface 30. In this case, the DMA circuit 24 enables the buffer memory 22 to be operated in the write mode and applies addresses thereto so that the transmission messages which are supplied from the data processing unit to the buffer memory 22 via the internal bus 32 can be stored into the buffer memory 22 in the order of the transmission time data LS contained therein. The ith transceiver converts the message received from the ith bus line into the data format required by the data processing unit and transfers the converted data to the buffer memory 22 through the internal bus 32. The protocol processor 28 returns to the step 52 after controlling the ith transceiver and the DMA circuit 24.

On the other hand, if it is checked at the step 56 that the interrupt signal is generated by the timer, the protocol processor 28 controls the DMA circuit 24 so that the transmission messages in the buffer memory 22 containing the transmission time data LS smaller than the current real-time can be removed, at the step 90. Then, the protocol processor 28 discriminates at the steps 92–100 on the basis of the current network status data CS, respectively, whether the current network status is in the second mode S1, the fourth mode S3, the fifth mode S4, the third mode S2 and the first mode S0. If it is discriminated at the step 92 that the current network status is in the second mode S1, the protocol processor 28 controls the ith transceiver through the transceiver interface 30 to stop the message transmission, at the step 102. Also at the step 102, the protocol processor 28 controls the DMA circuit 24 so that the transmission messages stored in the buffer memory 22 can be rearranged in the order of the transmission time data LS contained therein. After performing the step 102, the protocol processor 28 changes the current network status data CS to "S2" to change the current network status to the third mode S2 at the step 104 and then returns to the step 52. If it is discriminated at the step 94 that the current network status is in the fourth mode S3, the protocol processor 28 returns to the step 52 to maintain the current network status of the fourth mode S3 as it is.

If it is discriminated at the step 96 that the current network status is in the fifth mode S4, the protocol processor 28 sends the transmission message stored in the buffer memory 22 to an idle one of the multiple bus lines 10, 12 and 14 through a "Pop-and-send" procedure at the step 106. The "Pop-and-Send" procedure signifies that one message has been sent according to the current window.

In the "Pop-and-Send" procedure, the protocol processor 28 checks whether at least one time window upper limit value is present in its scratchpad memory. If it is checked that no time window upper limit value is present in the scratchpad memory, the protocol processor 28 sets a time window with an upper limit value obtained by adding a predetermined time period δ (for example, 10 seconds) to the current real-time t and a normal time width (10 seconds) between the current real-time t and the obtained upper limit value. The protocol processor then stores the upper limit value of the set time window into its scratchpad memory on the contrary, if it is checked that at least one time window upper limit value is present in the scratchpad memory, the protocol processor 28 sets a new time window with a width between the current real-time t and the just before stored time window upper limit value. The protocol processor 28 then checks whether one of the transmission messages containing one of the transmission time data LS corresponding to the newly set time window is stored in the buffer memory 22. If it is checked that one of the transmission messages containing one of the transmission time data LS corresponding to the newly set time window is stored in the buffer memory 22, the protocol processor 28 controls the DMA circuit 24 so that the corresponding transmission message can be sent from the buffer memory 22 to an idle one of the multiple bus lines 10, 12 and 14. Also, the protocol processor 28 changes the operation of the transceiver connected to the idle bus line to a transmission mode. In this case, the DMA circuit 24 enables the buffer memory 22 to be operated in a read mode and applies an address thereto so that the corresponding transmission message from the buffer memory 22 can be sent to the idle bus line through the internal bus 32 and the transceiver connected to the idle bus line. The transceiver connected to the idle bus line converts the transmission message from the buffer memory 22 into the data format required by the idle bus line and transfers the converted data to the idle bus line.

If it is discriminated at the step 98 that the current network status is in the third mode S2, the protocol processor 28 sends the transmission message stored in the buffer memory 22 to an idle one of the multiple bus lines 10, 12 and 14 through a "Contract-Window-and-Send" procedure at the step 108. The "Contract-Window-and-Send" procedure is performed in the case where at least two transmission messages containing the transmission time data LS corresponding to the current time window are present in the multi-bus transmission system.

In the "Contract-Window-and-Send" procedure, the protocol processor 28 checks whether at least one time window upper limit value is present in its scratchpad memory. If it is checked that no time window upper limit value is present in the scratchpad memory, the protocol processor 28 sets a time window with an upper limit value obtained by adding a predetermined time period δ (for example, 10 seconds) to the current real-time t and a normal time width (10 seconds) between the current real-time t and the obtained upper limit value. Then, the protocol processor stores the upper limit value of the set time window into its scratchpad memory. On the contrary, if it is checked that at least one time window upper limit value is present in the scratchpad memory, the protocol processor 28 sets a new time window with an upper limit value obtained by adding (the just before stored time window upper limit value–the current real-time t)/2 to the current real-time t and a width between the current real-time t and the obtained upper limit value, namely, ½ a width of the just before time window. The protocol processor 28 then checks whether one of the transmission messages containing one of the transmission time data LS corresponding to the newly set time window is stored in the buffer memory 22. If it is checked that one of the transmission messages containing one of the transmission time data LS corresponding to the newly set time window is stored in the buffer memory 22, the protocol processor 28 controls the DMA circuit 24 so that the corresponding transmission message can be sent from the buffer memory 22 to an idle one of the multiple bus lines 10, 12 and 14. Also, the protocol processor 28 changes the operation of the transceiver connected to the idle bus line to the transmission mode. In this case, the DMA circuit 24 enables the buffer memory 22 to be operated in the read mode and applies an address thereto so that the corresponding transmission message from the buffer memory 22 can be sent to the idle bus line through the internal bus 32 and the transceiver connected to the idle bus line. The transceiver connected to the idle bus line converts the transmission message from the buffer memory 22 into the data format required by the idle bus line and transfers the converted data to the idle bus line.

If it is discriminated at the step 100 that the current network status is in the first mode S0, the protocol processor 28 tries sending a queuing transmission message through an "Expand-Window-and-Send" procedure at the step 110. The "Expand-Window-and-Send" procedure is performed in the case the transmission message sent through the "Contract-Window-and-Send" procedure collides with that from a different multi-bus real-time message transmitter. Namely, the "Expand-Window-and-Send" procedure is performed when at least two transmission messages are present in a time window between the upper limit value of the contracted time window and the upper limit value of the normal time window.

In the "Expand-window-and-Send" procedure, the protocol processor 28 checks whether at least one time window upper limit value is present in its scratchpad memory. If it is checked that no time window upper limit value is present in the scratchpad memory, the protocol processor 28 sets a time window with an upper limit value obtained by adding a predetermined time period δ (for example, 10 seconds) to the current real-time t and a normal time width (10 seconds) between the current real-time t and the obtained upper limit value. Then, the protocol processor stores the upper limit value of the set time window into its scratchpad memory on the contrary, if it is checked that at least one time window upper limit value is present in the scratchpad memory, the protocol processor 28 sets a new time window with an upper limit value obtained by adding (the initially stored time window upper limit value–the just before stored time window upper limit value)/2 to the current real-time t and a width between the current real-time t and the obtained upper limit value. Then, the protocol processor 28 stores the upper limit value of the newly set time window into its scratchpad memory. Here, the upper limit value of the newly set current time window is an intermediate one of the initially stored time window upper limit value and the just before stored time window upper limit value. The protocol processor 28 then checks whether one of the transmission messages containing one of the transmission time data LS corresponding to the newly set time window is stored in the buffer memory 22. If it is checked that one of the transmission messages containing one of the transmission time data LS corresponding to the newly set time window is stored in the buffer memory 22, the protocol processor 28 controls the DMA circuit 24 so that the corresponding transmission message can be sent from the buffer memory 22 to an idle one of the multiple bus lines 10, 12 and 14. Also, the protocol processor 28 changes the operation of the transceiver connected to the idle bus line to the transmission mode. In this case, the DMA circuit 24 enables the buffer memory 22 to be operated in the read mode and applies an address thereto so that the corresponding transmission message from the buffet memory 22 can be sent to the idle bus line through the internal bus 32 and the transceiver connected to the idle bus line. The transceiver connected to the idle bus line converts the transmission message from the buffet memory 22 into the data format required by the idle bus line and transfers the converted data to the idle bus line. With the "Contract-Window-and-Send" procedure and the "Expand-Window-and-Send" procedure repeatedly performed, it can be detected that two transmission messages with the same transmission time data LS are present in the multi-bus transmission system and at least one thereof can be transmitted.

As apparent from the above description, according to the present invention, the time window can be changed appropriately according to the status of the multi-bus and the message transmission state so that the transmission message can be sent in the proper time. Therefore, the message transmission amount is not biased to any one bus line. This has the effect of enhancing the message transmission efficiency of the multi-bus transmission system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A multi-bus real-time message transmitter comprising:
   memory means for temporarily storing transmission messages, each of said transmission messages containing transmission time data designating the time that said transmission message is to be sent;
   a plurality of transceivers connected to a plurality of bus lines, respectively, said plurality of transceivers sensing statuses of the corresponding bus lines, outputting resultant bus line status data, sending the transmission messages stored in said memory means to the corresponding bus lines and sending messages received from the corresponding bus lines to said memory means;
   timer means for generating an interrupt signal at a fixed period and counting real-time; and
   a protocol controller for determining a network status in response to the bus line status data from said plurality of transceivers, setting a time window whenever the interrupt signal is generated by said timer means, said time window being adjusted in time width according to the determined network status, and controlling said plurality of transceivers and said memory means so that one of the transmission time data corresponding to the set time window can be sent from said memory means to an idle one of said plurality of bus lines through any one of said plurality of transceivers.

2. A multi-bus real-time message transmitter as set forth in claim 1, further comprising:
   transceiver interface means connected between said plurality of transceivers, and said protocol controller for transferring the bus line status data from said plurality of transceivers to said protocol controller and transferring control signals from said protocol controller to said plurality to transceivers.

3. A multi-bus real-time message transmitter as set forth in claim 2, wherein said timer means is in synchronization with different timer means, said different timer means being contained in another transmitter connected to said plurality of bus lines.

4. A method of controlling a multi-bus real-time message transmission comprising the steps of:
   detecting busy and idle statuses and message collisions of a plurality of bus lines and determining a network status in accordance with a detected result;
   counting a real-time;
   inputting transmission messages containing transmission time data;
   setting a time window at the fixed period, said time window being adjusted in time width according to the determined network status;
   searching for one of the transmission messages containing one of the transmission time data corresponding to the set time window and sending the searched transmission message to the idle bus line.

* * * * *